(12) United States Patent
Ozawa

(10) Patent No.: US 9,641,355 B2
(45) Date of Patent: May 2, 2017

(54) COMMUNICATION DEVICE, COMMUNICATION METHOD, AND PROGRAM

(71) Applicant: NEC Corporation, Tokyo (JP)

(72) Inventor: Hirokazu Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 415 days.

(21) Appl. No.: 14/344,609

(22) PCT Filed: Sep. 21, 2012

(86) PCT No.: PCT/JP2012/074188
§ 371 (c)(1),
(2) Date: Mar. 13, 2014

(87) PCT Pub. No.: WO2013/047355
PCT Pub. Date: Apr. 4, 2013

(65) Prior Publication Data
US 2014/0347982 A1    Nov. 27, 2014

(30) Foreign Application Priority Data

Sep. 26, 2011  (JP) .................................. 2011-208639

(51) Int. Cl.
*H04L 12/46*    (2006.01)
*H04L 12/801*    (2013.01)
(Continued)

(52) U.S. Cl.
CPC ...... *H04L 12/4679* (2013.01); *H04L 41/0213* (2013.01); *H04L 43/00* (2013.01);
(Continued)

(58) Field of Classification Search
CPC . H04L 12/4679; H04L 41/0213; H04L 43/00; H04L 43/0817; H04L 47/12; H04L 47/13; H04L 41/0233
See application file for complete search history.

(56) References Cited

U.S. PATENT DOCUMENTS

| 6,393,472 B1 | 5/2002 | Anerousis et al. |
| 2006/0200862 A1 | 9/2006 | Olson et al. |

(Continued)

FOREIGN PATENT DOCUMENTS

| CN | 1777129 | 5/2006 |
| CN | 102006267 | 4/2011 |

(Continued)

OTHER PUBLICATIONS

E. Bell et al., RFC 2674, "Definitions of Managed Objects for Bridges with Traffic Classes, Multicast Filtering and Virtual LAN Extensions," Aug. 1999, pp. 1-93.*

(Continued)

*Primary Examiner* — Melvin Marcelo
(74) *Attorney, Agent, or Firm* — Young & Thompson

(57) ABSTRACT

A communication device includes a communication unit that has a plurality of ports and relays data in accordance with a setting status of a plurality of VLANs; a status information management unit that manages, for each of the ports, status information that indicates whether or not the port is currently used by each of the VLANs; and an SNMP processing unit that receives a request, on a port-by-port basis, for the status information in accordance with an SNMP, obtains the status information, on a port-by-port basis, from the status information management unit, and sends the obtained status information to another device in accordance with the SNMP.

4 Claims, 5 Drawing Sheets

(51) Int. Cl.
H04L 12/24 (2006.01)
H04L 12/26 (2006.01)
(52) U.S. Cl.
CPC .......... *H04L 43/0817* (2013.01); *H04L 47/12* (2013.01); *H04L 47/13* (2013.01); *H04L 41/0233* (2013.01)

(56) References Cited

U.S. PATENT DOCUMENTS

| | | | | |
|---|---|---|---|---|
| 2007/0274234 | A1* | 11/2007 | Kubota | H04L 41/0853 370/254 |
| 2011/0216670 | A1* | 9/2011 | Sriranganath | H04L 12/28 370/255 |

FOREIGN PATENT DOCUMENTS

| | | |
|---|---|---|
| JP | 2007-135109 | 5/2007 |
| JP | 2007-180768 | 7/2007 |
| JP | 2008-124839 | 5/2008 |

OTHER PUBLICATIONS

Extened European Search Report—EP 12 83 7254—May 15, 2015.
International Search Report PCT/JP2012/074188 dated Nov. 13, 2012.
Chinese Official Action—201280046512.0—May 5, 2016.

* cited by examiner

COMMUNICATION DEVICE, COMMUNICATION METHOD, AND PROGRAM

TECHNICAL FIELD

The present invention relates to a communication device, a communication method, and a program.

Priority is claimed on Japanese Patent Application No. 2011-208639, filed Sep. 26, 2011, the contents of which are incorporated herein by reference.

BACKGROUND ART

In a technique that has been proposed recently, an operation status of a network is monitored by an NMS (Network Management System) or a local control terminal which utilizes an SNMP (Simple Network Management Protocol) (see, for example, Patent Document 1).

A communication device that is a target to be monitored in the above-described manner discloses setting information or operating information of the present device by means of an MIB (Management Information Base) that is a database for managing devices in a communication network.

The NMS or the local control terminal acquires information, that is published by the MIB, via the relevant network.

For example, when monitoring a network status of a VLAN (Virtual Local Area Network) utilizing an SNMP, generally, a standard MIB defined in "RFC 2674" or the like or an extended MIB provided by an individual device vendor is utilized.

FIG. 5 is a diagram that shows a VLAN data structure of the standard MIB defined in RFC (Request for Comments) 2674.

In the standard MIB (dot1qVlanCurrentTable) that defines each status of VLANs, each port in each VLAN is managed by the bit. In the example of FIG. 5, VLAN management data 930 of each VLAN is stored in the MIB.

The VLAN management data 930 includes group data items 940, each of which is one-byte (octet string) data. Each group data item 940 contains eight individual data items 950. Each individual data item 950 indicates the status of one target port by 1 bit.

For example, if the relevant port is active (currently used) in the VLAN, the individual data item 950 has a value of "1". In contrast, if the relevant port is not active in the VLAN, the individual data item 950 has a value of "0".

According to such a structure, in the standard MIB, the amount data is increased by the byte (corresponding to eight ports).

As described above, in the standard MIB defined in RFC 2674, the status of each port is managed for each VLAN. Therefore, in order to check the states of VLANs, a "Get Request" message of SNMP is sent, for each VLAN, from the NMS to the relevant communication device so as to obtain the VLAN management data 930. Accordingly, the number of "Get Request" messages sent from the NMS to the communication device increases according to an increase in the number of VLANs registered with the communication device.

PRIOR ART DOCUMENT

Patent Document

Patent Document 1: Japanese Unexamined Patent Application, First Publication No. 2007-180768.

DISCLOSURE OF INVENTION

Problem to be Solved by the Invention

Accompanied with an increase in the amount of traffic for transferred data or in the number of networks to be connected, a complex network management is required. Therefore, the number of VLANs (i.e., the number of VLAN IDs) registered with one communication device tends to increase.

For example, if it is assumed for the standard MIB (dot1qVlanCurrentTable) that 4094 VLANs (as the upper limit) can be registered, the "Get Request" message should be processed 4094 times so as to obtain the status of each port for every VLAN.

An increase in the "Get Request" messages for SNMP causes an increase in the communication volume introduced into a network for management use, which may put pressure on communications performed for other management purposes.

Such communications for other management purposes may include a communication for providing a status or failure report based on a protocol other than SNMP, or a communication for control that is performed in response to a change in the network configuration. The above-described problem is especially serious when the management network has a narrow communication band. In this case, the above-described communications performed for other management purposes get pressure, which may produce a delay in services provided via a network that includes the relevant communication device.

In light of the above circumstances, an object of the present invention is to provide a technique for reducing the communication volume produced when managing a communication device, with which a plurality of VLANs is registered, by utilizing an SNMP.

Means For Solving the Problem

The present invention provides a communication device comprising:

a communication unit that has a plurality of ports and relays data in accordance with a setting status of a plurality of VLANs;

a status information management unit that manages, for each of the ports, status information that indicates whether or not the port is currently used by each of the VLANs; and an SNMP processing unit that:
receives a request, on a port-by-port basis, for the status information in accordance with an SNMP;
obtains the status information, on a port-by-port basis, from the status information management unit.; and
sends the obtained status information to another device in accordance with the SNMP.

The present invention also provides a communication method performed by a communication device that has a communication unit which has a plurality of ports and relays data in accordance with a setting status of a plurality of VLANs, the method comprising:

a status information management step that manages, for each of the ports, status information that indicates whether or not the port is currently used by each of the VLANs; and an SNMP processing step that:
receives a request, on a port-by-port basis, for the status information in accordance with an SNMP;
obtains the status information on a port-by-port basis; and
sends the obtained status information to another device in accordance with the SNMP.

The present invention also provides a program that makes a communication device, that has a communication unit which has a plurality of ports and relays data in accordance with a setting status of a plurality of VLANs, execute;

a status information management step that manages, for each of the ports, status information that indicates whether or not the port is currently used by each of the VLANs; and an SNMP processing step that:

receives a request, on a port-by-port basis, for the status information in accordance with an SNMP;

obtains the status information on a port-by-port basis; and sends the obtained status information to another device in accordance with the SNMP.

Effect of the Invention

In accordance with the present invention, it is possible to reduce the communication volume produced when managing a communication device, with which a plurality of VLANs is registered, by utilizing an SNMP.

MODE FOR CARRYING OUT THE INVENTION

Figure 1:
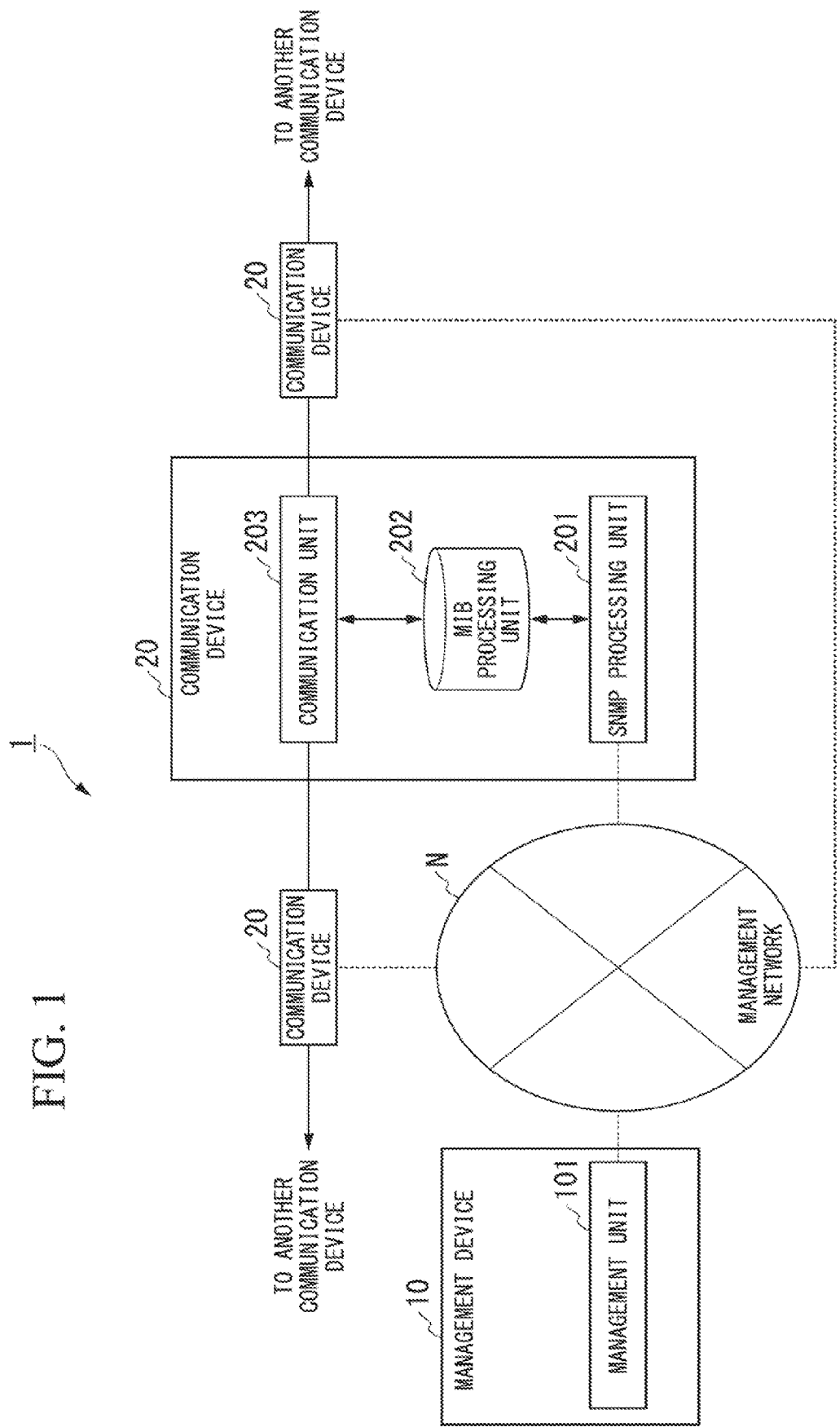
FIG. 1 is a system configuration diagram that shows the system configuration of a communication device management system in an embodiment of the present invention.

FIG. 1 is a system configuration diagram that shows the system configuration of a communication device management system 1 in an embodiment of the present invention.

The communication device management system 1 has a management device 10 and communication devices 20, which are connected to each other via a management network N is a communicable manner.

The management device 10 manages the communication devices 20 by means of communication in accordance with SNMP. That is, each management device 10 functions as an NMS and manages the status of each communication device 20 by means of communication utilizing the management network N.

The communication devices 20 are connected to each other so that a communication network is formed. Each communication device 20 relays data that is received from another communication device 20.

FIG. 1 shows three communication devices 20 connected to the management network N.

The status of each communication device 20 is managed by the management device 10.

The number of communication devices 20 is not limited to three. For example, a communication device 20 (not shown) which also forms the communication network together with the shown communication devices 20 may be connected to the management network N. In addition, a communication device 20 (not shown) which forms a communication network other than that formed by the shown communication devices 20 may be connected to the management network N.

The management device 10 is configured utilizing an information processing apparatus such as a main frame, a workstation, or a personal computer. The management device 10 includes a CPU (Central Processing Unit), a memory, an auxiliary storage device that are connected via a bus. The management device 10 functions as a device having an management unit 101, by running a management program.

All or part of the functions of the management device 10 may be implemented utilizing a hardware resource such as an ASIC (Application Specific Integrated Circuit), a PLD (Programmable Logic Device), or an FPGA (Field Programmable Gate Array).

Additionally, the above-described management program may be stored in a computer-readable storage medium. The computer-readable storage medium may be a portable medium such as a flexible disk, a magneto optical disk, a ROM, or a CD-ROM, or a storage device such as a hard disk built in a computer system. The management program may be communicated via an electronic communication line.

The management unit 101 functions as a manager (NMS) for SNMP and sends a PDU (Protocol Data Unit) such as "Get Request", "Get Next Request", or "Set Request" to each communication device 20 based on SNMP.

Below, the PDU such as "Get Request", "Get Next Request", or "Set Request" is called a "request message". The request message is a message utilized to request information that indicates the status of the communication device 20 (which is called "status information" below).

The management unit 101 also receives a PDU such as "Get Response" or "Trap" from each communication device 20 so as to obtain the status information that indicates the status of the communication device 20. Below, the PDU such as "Get Response" or "Trap" is called a "notification message". The notification message is a message that includes the status information of the communication device 20.

Each communication device 20 is a relay device (e.g., a router or an L2 switch) that can perform setting for a VLAN. The communication device 20 includes a CPU, a memory, an auxiliary storage device that are connected via a bus, and executes a program for a device to be managed. In addition, the communication device 20 functions as a device that includes an SNMP processing unit 201, an MIB processing unit 202, and a communication unit 203.

All or part of the functions of the communication device 20 may be implemented utilizing a hardware resource such as an ASIC, a PLD, or an FPGA. Additionally, the above-described program for a device to be managed may be stored in a computer-readable storage medium.

The computer-readable storage medium may be a portable medium such as a flexible disk, a magneto optical disk, a ROM, or a CD-ROM, or a storage device such as a hard disk built in a computer system. The program for a device to be managed may be communicated via an electronic communication line.

The SNMP processing unit 201 functions as an agent for SNMP and issues, based on SNMP, a notification message such as "Get Response" in response to a request message such as "Get Request", "Get Next Request", or "Set Request". The SNMP processing unit 201 may voluntarily send a notification message to any management device 10, in accordance with the setting of the management device 10.

In order to generate a notification message, the SNMP processing unit 201 requests the MIB processing unit 202 to retrieve status information that should be communicated to the management device 10.

When receiving the status information from the MW processing unit 202, the SNMP processing unit 201 generates a notification message that includes the status information, based on SNMP. The SNMP processing unit 201 sends the generated notification message to the management device 10.

The MIB processing unit 202 functions as an MIB, that is, obtains and stores status information on the communication device 20 in which the MIB processing unit 202 itself is provided. For example, the MIB processing unit 202 communicates with the communication unit 203 of the communication device 20 which includes this MIB processing unit 202 so as to obtain status information on this communication unit 203. The MIB processing unit 202 stores the obtained status information in a data structure in accordance with a definition of the extended MIB.

Figure 2:
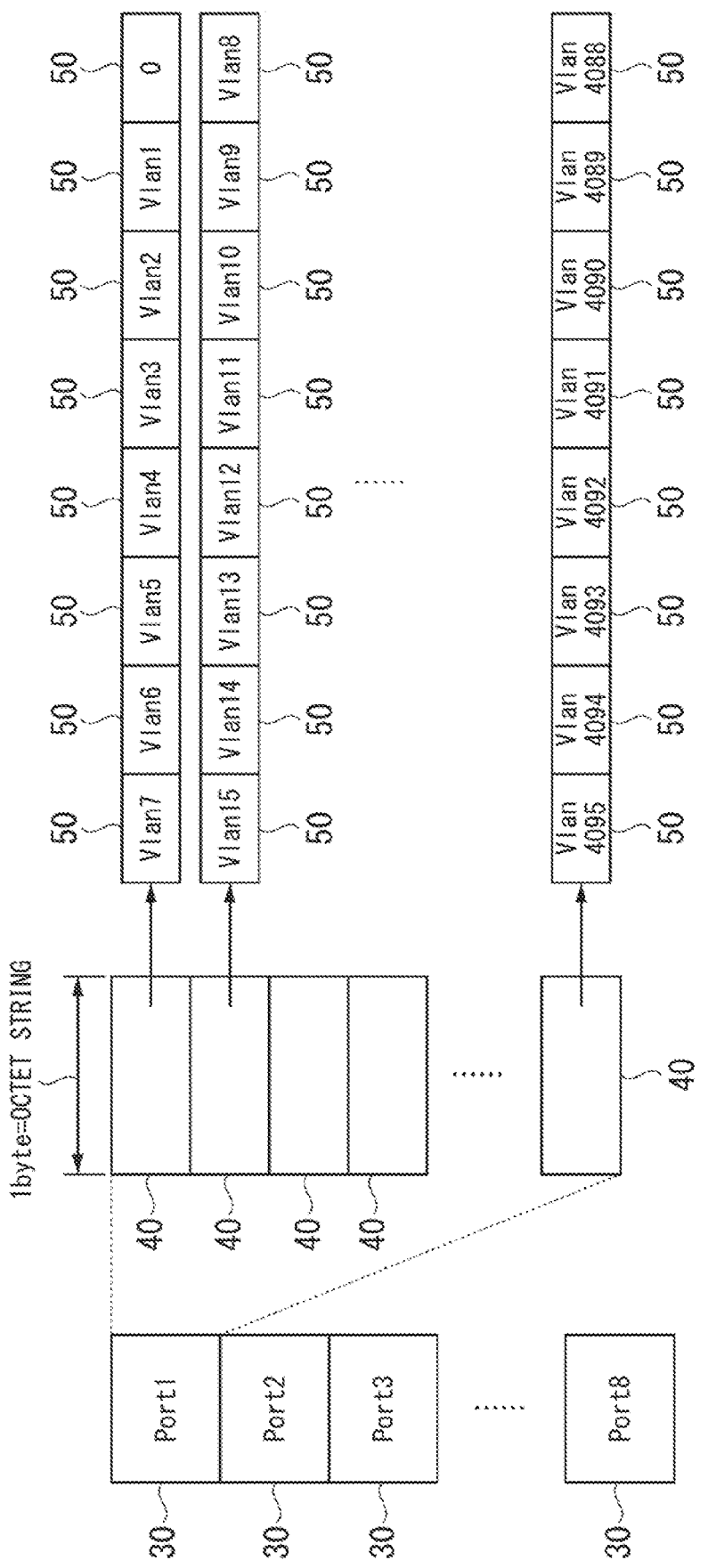
FIG. 2 is a diagram that shows a general data structure utilized by an MIB processing unit to store the status information.

FIG. 2 is a diagram that shows a general data structure utilized by the MIB processing unit 202 to store the status information. The MIB processing unit 202 manages, for each port, information that indicates the status of each VLAN.

In the example of FIG. 2, the MIB processing unit 202 store port management data items 30 associated with individual ports. An object ID is assigned to each port management data item 30. That is, a number of object IDs according to the number of ports provided at the relevant communication device 20 are allocated to the MIB processing unit 202. The MIB processing unit 202 discloses the status information based on the port management data item 30.

Each port management data item 30 includes group data items 40.

Each group data item 40 is one-byte (octet string) data, and contains eight individual data items 50.

Each individual data items 50 represents a status of one VLAN. For example, if the relevant port is active (currently used) in the VLAN, the individual data item 50 has a value of "1". In contrast, if the relevant port is not active in the VLAN, the individual data item 50 has a value of "0".

In accordance with the number of VLANs provided at the relevant communication device 20, each port management data item 30 stores one or more group data items 40.

According to the above structure, in the MIB processing unit 202 based on the extended MIB, data is increased by the byte that corresponds to eight VLANs. In the example of FIG. 2, eights ports are provided at the communication device 20, and 4095 VLANs are set.

Therefore, eight port management data item 30 are stored in the MIB processing unit 202, each of which stores 512 group data items 40, each of which stores 8 individual data items 50.

The communication unit 203 communicates with other communication devices 20 connected to the present communication device 20 in a communicable manner. The communication unit 203 has one or more ports and transfers data, that is received via any port, to another port based on a predetermined definition for the VLANs.

For example, the communication unit 203 receives data from another communication device 20 and determines an addressee for data transfer, based on header information of the received data and the predetermined VLAN definition. The communication unit 203 then outputs the data for the transfer from a port that corresponds to the determined addressee.

The management device 10 performs the processing based on SNMP so as to collect data stored in the MIB processing unit 202 in each communication device 20. As specific examples of such collecting sequences, two operation flows will be shown below.

First Sequence

Figure 3:
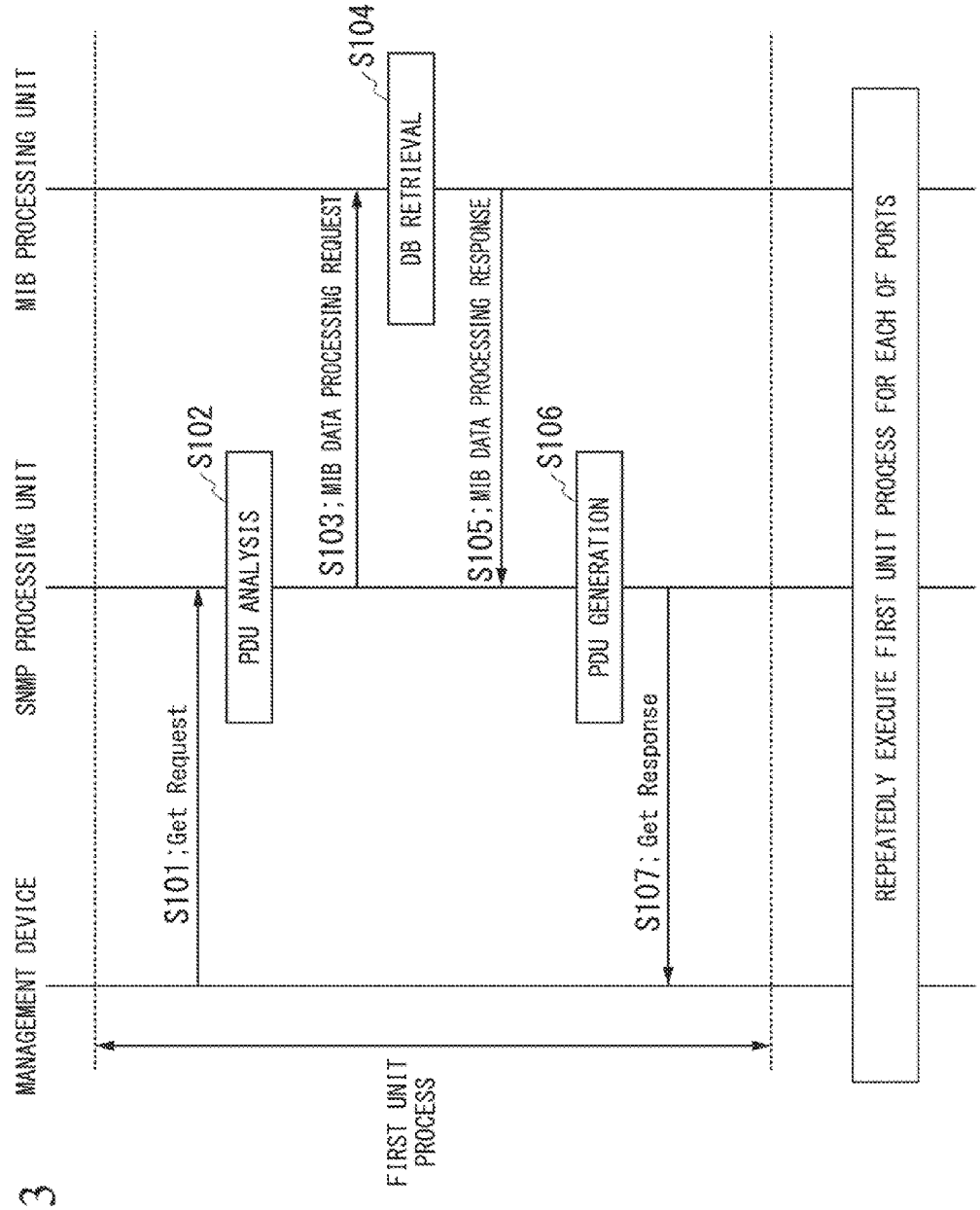
FIG. 3 is a diagram that shows a first sequence as an SNMP process performed by a management device and each communication device.

FIG. 3 is a diagram that shows a first sequence as an SNMP process performed by the management device 10 and each cone device 20.

In the first sequence, the management unit 101 sends a request message pertaining to each port provided in the image storage unit 20 and receives a notification message pertaining to each port. The first sequence will be explained in detail below.

First, the management device 10 sends "Get Request" (i.e., a request message) via the management network N to the relevant communication device 20 (see step S101).

When receiving the "Get Request" message, the SNMP processing unit 201 of the communication device 20 performs a PDU analysis so as to confirm the object ID included in the received Get Request (see step S102).

Then the SNMP processing unit 201 generates an MIB data processing request utilized to request the port management data item 30 of a port designated by the object ID, and sends the generated request to the MIB processing unit 202 (see step S103).

According to the received MIB data processing request, the MIB processing unit 202 retrieves the port management data item 30 of the requested port (see step S104). The MIB processing unit 202 then returns an MIB data processing response that includes the retrieved port management data item 30 to the SNMP processing unit 201 (see step S105).

The SNMP processing unit 201 extracts the port management data item 30 from the received MIB data processing response. The SNMP processing unit 201 then executes a PDU generation process to generate "Get Response" (i.e., a notification message) that includes the extracted port management data item 30 (see step S106).

The SNMP processing unit 201 sends the generated "Get Response" via the management network. N to the management device 10 (see step S107).

When receiving "Get Response" via the management network N from the SNMP processing unit 201, the management unit 101 of the management device 10 extracts the port management data item 30 from the received Get Response so as to obtain information pertaining to the relevant one port.

In the first sequence, a sequence of steps from S101 to S107 is called a "first unit process". The management device 10 repeatedly executes the first unit process for each of the ports for which information is required.

For example, in order to obtain information about all ports provided in the communication device 20, the management device 10 repeatedly executes the first unit process for said all ports. That is, by repeatedly executing the first unit process eight times, the management device 10 can obtain status information about all VLANs of the communication device 20.

If the request message sent in the above step S101 is "Set Request", the MIB processing unit 202 performs, in step S104, not only the retrieval of the port management data item 30, but also an MIB data updating process.

When employing a conventional standard MIB, a sequence of steps from "Get Response" transmission to "Get Response" reception (the sequence corresponds to the first unit process) is repeatedly executed for each of VLANs. Here, it is assumed that the processing time required for one VLAN is t1. On the other hand, when performing the above-described operation shown in FIG. 3, it is assumed that the processing time required for the first unit process is t2. It is also assumed that the communication device 20 has eight ports, and the number of VLANs registered with the communication device 20 is 4094, that is the defined maximum number.

It is further assumed that t1 and t2 are the same (processing time). In this case, in order to obtain the status information about all VLANs, the conventional standard MIB requires a time computed by "the number of VLANs× t1=4094×t1". In contrast, in order to obtain the status information about all VLANs, the first unit process shown in FIG. 3 requires a time computed by "the number of ports× t2=8×t2". Therefore, in comparison with the conventional method, the communication device management system 1 can perform the relevant operation in approximately one-512th of the time required in the conventional method.

Accordingly, the communication device management system 1 provides a distinctive effect when the number of registered VLANs is greater than the number of ports.

Second Sequence

Figure 4:
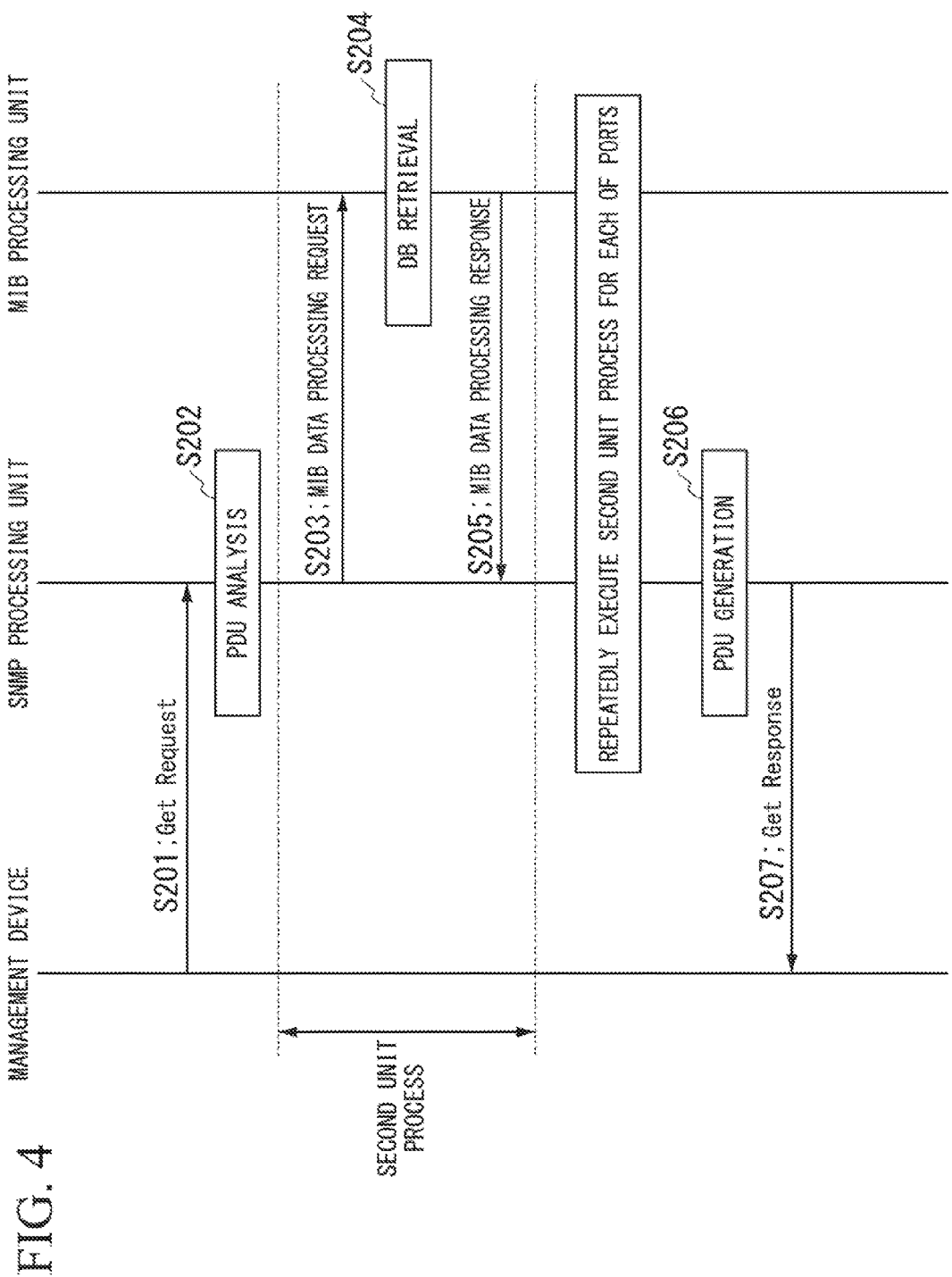
FIG. 4 is a diagram that shows a second sequence as an SNMP process performed by a management device and each communication device.
Figure 5:
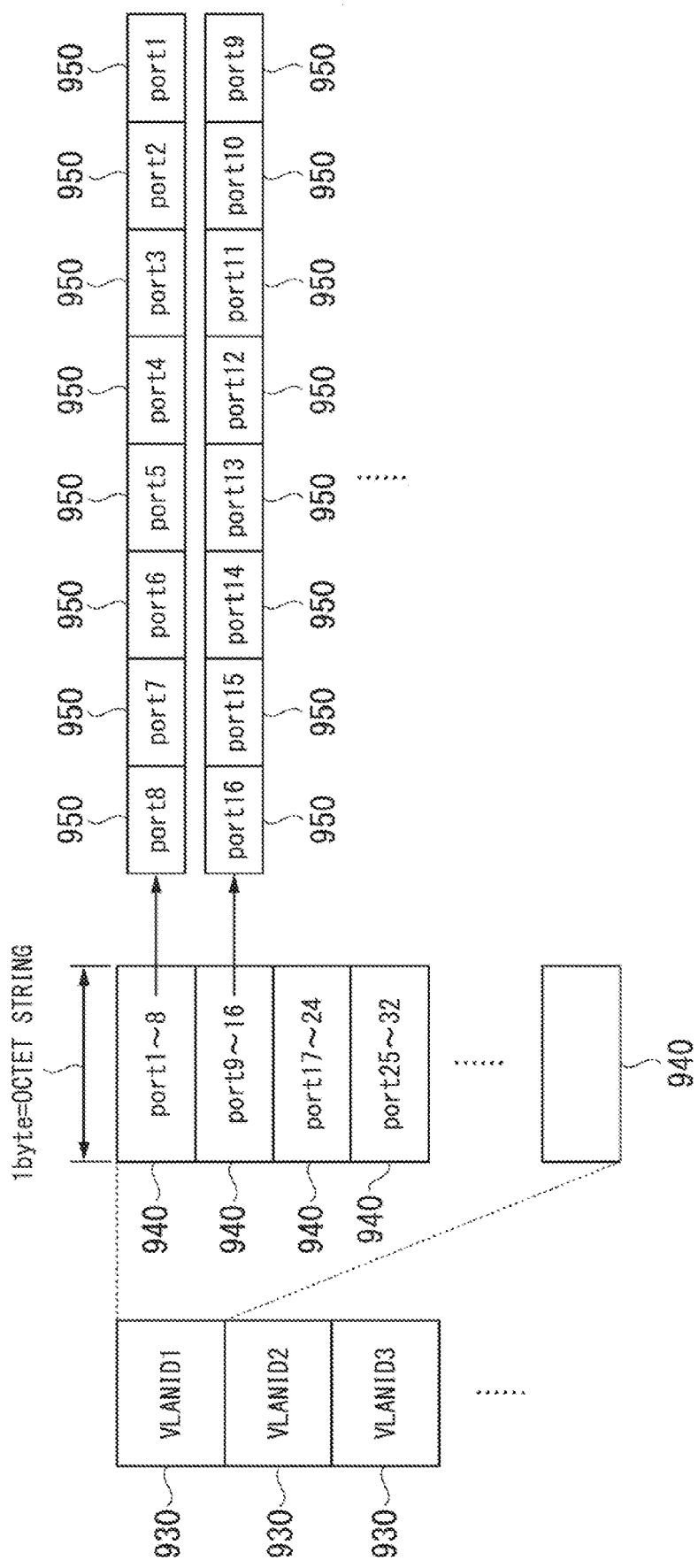
FIG. 5 is a diagram that shows a VLAN data structure of a standard MIB defined in RFC 2674.

FIG. 4 is a diagram that shows a second sequence as an SNMP process performed by the management device 10 and each communication device 20.

In the second sequence, the management unit 101 sends one request message pertaining to a plurality of ports provided in the image storage unit 20 and receives a notification message that includes a status notification pertaining to the plurality of the ports. The second sequence will be explained in detail below.

First, the management device 10 generates "Get Request" (i.e., a request message) that includes a plurality of object IDs, and sends this Get Request via the management network N to the relevant communication device 20 (see step S201).

When receiving the "Get Request" message, the SNMP processing unit 201 of the communication device 20 subjects the received Get Request to a PDU analysis so as to obtain the plurality of the object IDs included in Get Request (see step S202).

Then the SNMP processing unit 201 then selects on of the object IDs included in Get Request and generates an MIB data processing request utilized to request the port management data item 30 of a port designated by the selected object ID. The SNMP processing unit 201 sends the generated MIB data processing request to the MIB processing unit 202 (see step S203).

According to the received MIB data processing request, the MIB processing unit 202 retrieves the port management data item 30 of the requested port (see step S204). The MIB processing unit 202 then returns an MIB data processing response that includes the retrieved port management data item 30 to the SNMP processing unit 201 (see step S205).

In the second sequence, a sequence of steps from S203 to S205 is called a "second unit process". In this second sequence, the SNMP processing unit 201 repeatedly executes the second unit process for each of the object IDs obtained by the PDU analysis. That is, the SNMP processing unit 201 repeatedly executes the second unit process a number of times which corresponds to the number of ports designated by the "Get Request" message.

For example, if "Get Request" that includes object IDs of all eight ports provided in the communication device 20 is received, the SNMP processing unit 201 repeatedly executes the second unit process for each of all ports. That is, the second unit process is repeated eight times, so that the SNMP processing unit 201 can obtain the status information of all VLANs registered with the relevant communication device 20.

After repeatedly executing the second unit process for each of all obtained object IDs, the SNMP processing unit 201 extracts the port management data item 30 from each MIB data processing response. The SNMP processing unit 201 then executes a PDU generation process to generate "Get Response" (i.e., a notification message) that includes the extracted port management data items 30 (see step S206).

The SNMP processing unit 201 sends the generated "Get Response" via the management network N to the management device 10 (see step S207).

When receiving "Get Response" via the management network N from the SNMP processing unit 201, the management unit 101 of the management device 10 acquires the port management data items 30 from the received Get Response.

If the request message sent in the above step S201 is "Set Request", the MIB processing unit 202 performs, in step S204, not only the retrieval of the port management data item 30, but also an MIB data updating process.

When employing a conventional standard MIB and issuing "Get Response" that includes a plurality of object IDs, a sequence of steps from the MIB data processing request to the MIB data processing response (the sequence corresponds to the second unit process) is repeatedly executed for each of VLANs. Here, it is assumed that the processing time required for one VLAN is t3. On the other hand, when performing the above-described operation shown in FIG. 4, it is assumed that the processing time required for the second unit process is t4. It is also assumed that the communication device 20 has eight ports, and the number of VLANs registered with the communication device 20 is 4094, that is the defined maximum number.

It is further assumed that t3 and t4 are the same (processing time). In this case, in order to obtain the status information about all VLANs, the conventional standard MIB requires a time computed by "the number of VLANs× t3=4094×t3". In contrast, in order to obtain the status information about all VLANs, the second unit process shown in FIG. 4 requires a time computed by "the number of ports×t4=8×t4". Therefore, in comparison with the conventional method, the communication device management system can perform the relevant operation in approximately one-512th of the time required in the conventional method.

Accordingly, the communication device management system 1 provides a distinctive effect when the number of registered VLANs is greater than the number of ports.

Below, effects obtained by the communication device management system 1 will be explained.

In order to obtain the status information of each port for each of all VLANs through the operation utilizing a conventional standard MIB, it is necessary to repeatedly execute a process, that corresponds to the first unit process or the second unit process, a number of times which corresponds to the number of the VLANs. Therefore, communication via the management network N may get pressure so that a certain communication via the management network N may be delayed.

Additionally, such a delay may affect operability of the management device 10, which may cause a problem for the operation of the network formed by the communication devices 20.

Furthermore, accompanied with an increase in the number of executions for processing the request message, a load for CPU processing, imposed on the communication device 20, increases, which may affect a user service provided by the communication device 20.

Regarding such conventional problems, in the communication device management system 1, even if a great number of VLANs are registered with the communication device 20, the number of SNMP messages communicated between the management device 10 (as the SNMP manager) and the communication device 20 (as the SNMP agent) can be reduced. Therefore, the communication volume required for monitoring and controlling the communication device 20 can be reduced.

That is in the communication device management system 1, a list of VLANs is stored in the MIB processing unit 202 by the port and is managed while an object ID is assigned to each port. Therefore, the request message such as "Get Request" is issued for each individual port. Accordingly, no matter how large the number of VLANs, the number of the request messages does not increase. Therefore, it is possible to reduce the number of executions for processing the messages, and thereby a time required for obtaining the status of each VLAN or changing the setting therefor can be reduced.

In addition, since the status of each VLAN is represented by binary values of "0" and "1". MIB data of one port can be compact to have a data amount of "the number of VLANs/8 (byte)". Therefore, in addition to the above-described reduction in the number of executions for processing the SNMP message, a communication band required for the relevant communication can be further reduced, and thereby the management network N can be efficiently operated.

Additionally, such a reduction in the number of executions for processing the SNMP message causes a reduction in the CPU usage time for the communication device 20. Therefore, it is possible to reduce a load imposed on a certain service provided by the communication device 20.

Variations

In order to handle "Provider Bridge" standardized by IEEE802.1ad, 512 bytes×3 per port may be utilized to represent C-VID (customer VLAN identifier) for C-Access, S-VID (service VLAN identifier) for S-Trunk, or S-VID for C-Bridge.

While embodiments of the present invention have been explained in detail referring to the drawings, specific structures are not limited to those embodiments. Design modifications can be made without departing from the scope of the present invention.

INDUSTRIAL APPLICABILITY

In accordance with the present invention, it is possible to reduce the communication volume produced when managing a communication device, with which a plurality of VLANs is registered, by utilizing an SNMP.

REFERENCE SYMBOLS

10 management device
20 communication device
101 management unit
201 SNMP processing unit
202 MIB processing unit (status information management unit)
203 communication unit
N management network

The invention claimed is:

1. A communication device that is a relay device, comprising:
    a communication unit that has a plurality of ports and relays data in accordance with a setting status of a plurality of Virtual Local Area Networks (VLANs);
    a status information management unit that manages a plurality of pieces of status information corresponding to the plurality of ports, respectively, each of the plurality of pieces of status information including a plurality of data, each of the plurality of data indicating whether or not the corresponding port is currently used by one of the VLANs; and
    a Simple Network Management Protocol (SNMP) processing unit that:
        receives a request indicating one of the plurality of ports, in accordance with an SNMP, and
        sends, each time the request is received, all of the plurality of data included in the status information corresponding to the port indicated by the request to another device in accordance with the SNMP.

2. The communication device in accordance with claim 1, wherein:
    the request includes an object identification (ID) indicating the one of the plurality of ports, and
    the SNMP processing unit sends, each time the request is received, all of the plurality of data included in the status information corresponding to the port indicated by the object ID to the other device in accordance with the SNMP.

3. A communication method performed by a communication device that is a relay device that has a communication unit which has a plurality of ports and relays data in accordance with a setting status of a plurality of Virtual Local Area Networks (VLANs), the method comprising;
    a status information management step that manages a plurality of pieces of status information corresponding to the plurality of ports, respectively, each of the plurality of pieces of status information including a plurality of data, each of the plurality of data indicating whether or not the corresponding port is currently used by one of the VLANs; and
    a Simple Network Management Protocol (SNMP) processing step that:
        receives a request indicating one of the plurality of ports, in accordance with an SNMP, and
        sends, each time the request is received, all of the plurality of data included in the status information corresponding to the port indicated by the request to another device in accordance with the SNMP.

4. A program that is stored on a non-transitory computer-readable medium and makes a communication device that is a relay device, that has a communication unit which has a plurality of ports and relays data in accordance with a setting status of a plurality of Virtual Local Area Networks (VLANs), execute:
    a status information management step that manages a plurality of pieces of status information corresponding to the plurality of ports, respectively, each of the plurality of pieces of status information including a plurality of data, each of the plurality of data indicating whether or not the corresponding port is currently used by one of the VLANs; and
    a Simple Network Management Protocol (SNMP) processing step that:
        receives a request indicating one of the plurality of ports, in accordance with an SNMP, and sends, each time the request is received, all of the plurality of data included in the status information corresponding to the port indicated by the request to another device in accordance with the SNMP.

* * * * *